(12) United States Patent
Mikkaichi et al.

(10) Patent No.: US 6,460,300 B2
(45) Date of Patent: Oct. 8, 2002

(54) WINDOW MOLDING

(75) Inventors: Toshiki Mikkaichi, Yokohama (JP);
Kenichi Ogura, Yokohama (JP);
Toshiya Yoshida, Yokohama (JP);
Tsuyoshi Kuriyama, Yokohama (JP)

(73) Assignee: Hashimoto Forming Industry Co. Ltd., Yokohama (JP)

( * ) Notice: Subject to any disclaimer, the term of this patent is extended or adjusted under 35 U.S.C. 154(b) by 0 days.

(21) Appl. No.: 09/727,850

(22) Filed: Nov. 30, 2000

(65) Prior Publication Data

US 2001/0003233 A1 Jun. 14, 2001

(30) Foreign Application Priority Data

Dec. 3, 1999 (JP) ............................ 11-345342

(51) Int. Cl.7 .............................. E06B 3/62; B60J 10/02
(52) U.S. Cl. .............................. 52/204.597; 52/204.67; 296/93
(58) Field of Search ................... 52/204.597, 204.67, 52/204.591, 204.62; 296/93, 84.1, 96.12, 96.21

(56) References Cited

U.S. PATENT DOCUMENTS

| | | | | |
|---|---|---|---|---|
| 2,606,635 A | * | 8/1952 | Clingman | 52/204.597 |
| 2,683,905 A | * | 7/1954 | Beck | 52/204.597 |
| 2,698,072 A | * | 12/1954 | Beck | 52/204.597 |
| 4,347,693 A | * | 9/1982 | Kruschwitz | 52/204.597 |
| 4,358,917 A | * | 11/1982 | Oda et al. | 52/204.597 |
| 5,248,179 A | * | 9/1993 | Biermacher et al. | 52/204.597 |
| 5,273,338 A | | 12/1993 | Gooding et al. | |
| 5,771,652 A | | 6/1998 | Nagata et al. | |
| 5,950,366 A | | 9/1999 | Uhlmeyer | |

FOREIGN PATENT DOCUMENTS

| | | | |
|---|---|---|---|
| DE | 44 27 464 A1 | 2/1996 | |
| JP | 59-165215 | 11/1984 | |
| JP | 5-330337 | * 12/1993 | ............ 296/93 |
| JP | 7-25260 | 3/1995 | |

* cited by examiner

*Primary Examiner*—Michael Safavi
(74) *Attorney, Agent, or Firm*—Kolisch Hartwell Dickinson McCormack & Heuser (57) ABSTRACT

A window molding which is easy to install, and in the installed state remains stable and the external appearance is superior, and does not show floating or generate abnormal noise during highspeed cruising and is able to be flush-surfaced easily. The window molding is constituted by: a molding body attached along a space between a window plate and a body panel; a protruding rib protruding from the molding body towards an external surface of the window plate; a leg section extending from the molding body towards the space; a sealing lip extending from the molding body towards an external surface of a body panel; a linking lip extending from the leg section towards the space-forming surface of the body panel and linking with a tip of the sealing lip or in a vicinity of the sealing lip to form a hollow section.

18 Claims, 5 Drawing Sheets

WINDOW MOLDING

BACKGROUND OF THE INVENTION

1. Field of the Invention

The present invention relates to a window molding to be attached to the peripheral section of a window plate of a vehicle.

1. Description of the Related Art

Figure 4:
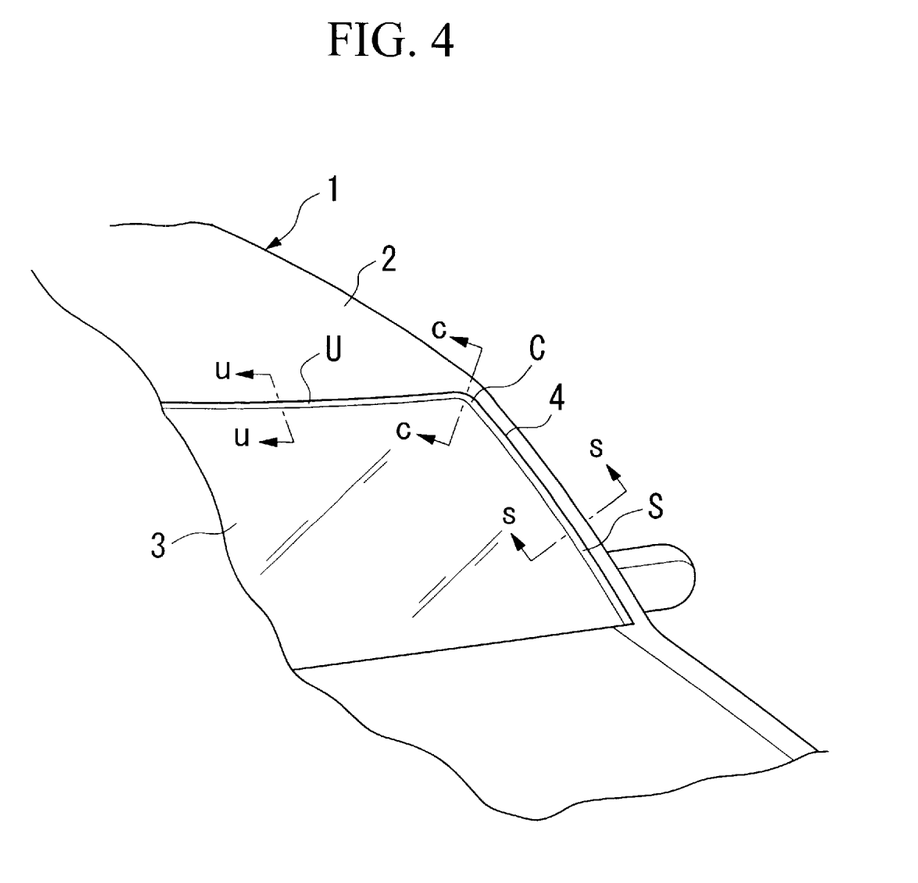
FIG. 4 is a perspective view of a portion of a vehicle.

FIG. 4 is a perspective view of a portion of a vehicle, and in the diagram, the reference numeral 1 relates to a vehicle body; 2 to a body panel; 3 to a window plate (windshield glass); 4 to a window molding; U to its upper segment; C to its corner segment; S to its side segment. The window molding 4 is attached to the periphery section of the window plate 3 so as to provide a seal between the body panels 2.

Figure 5A:
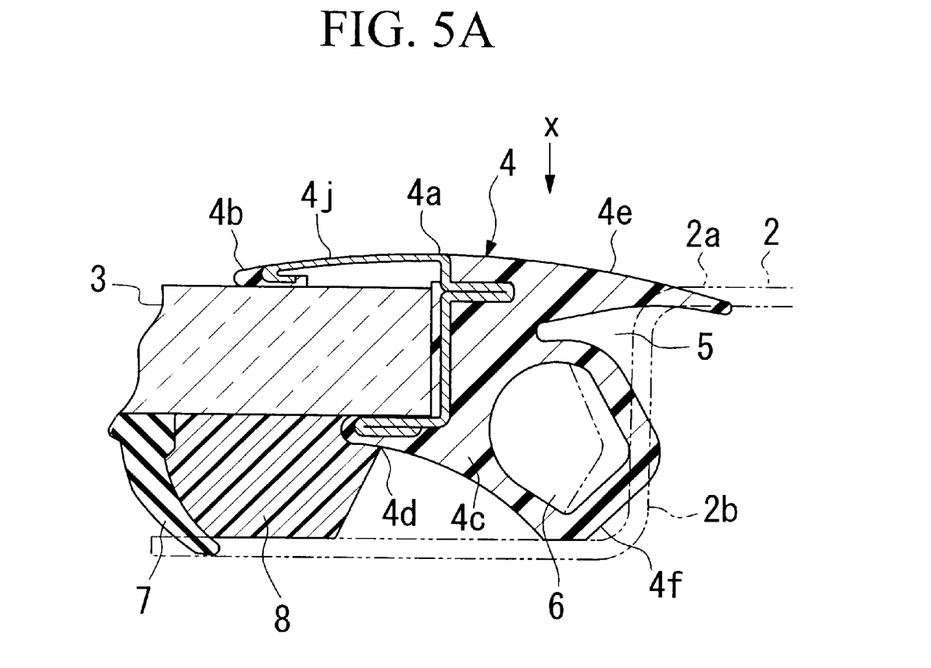
FIGS. 5A and 5B are cross sectional views of a conventional window molding.
Figure 5B:
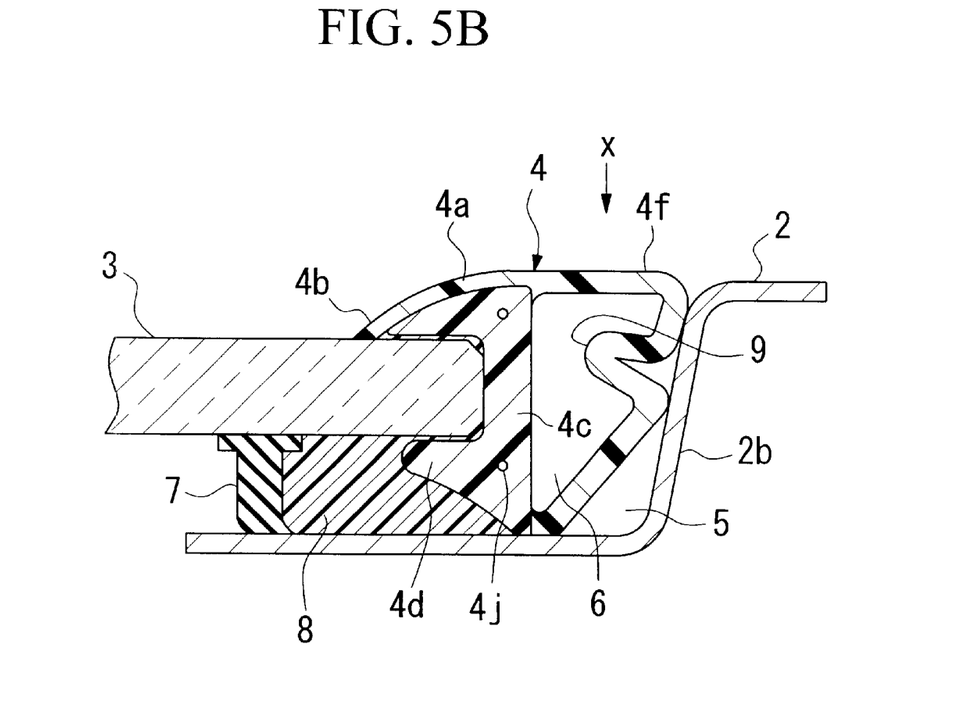

FIG. 5A is a cross sectional view of a window molding through a plane u—u in FIG. 4, disclosed in a Japanese Utility Model Application, First Publication, Sho 59-165215, and FIG. 5B is the same disclosed in a Japanese Patent Application, First Publication, Hei 3-153415.

The window molding 4 in FIG. 5A comprises: a molding body 4*a* to be attached along a space 5 between the window plate 3 and the body panel 2; a protruding rib 4*b* protruding from the molding body towards the external surface of the window plate; a leg section 4*c* extending from the molding body 4*a* towards the space 5; an engaging section 4*d* formed on the window plate 3 side of the leg section 4*c*; a sealing lip 4*e* extending from the molding body 4*a* towards the external surface 2*a* of the body panel 2; and a linking lip 4*f* extending from the leg section 4*c* towards the space-forming surface 2*b* of the body panel 2 and forming a hollow section 6.

The window molding 4 is attached to the window plate 3, and after discharging an adhesive agent 8 into the gap to dam rubber 7, it is inserted between the space-forming surface 2*b* of the body panel 2 in the x-arrow direction and the adhesive agent is hardened to produce a window.

However, such a structure of the window molding 4 allows the linking lip 4*f* to be deformed greatly and easily in the up-and-down direction, and the friction caused by the space-forming surface 2*b* makes it not only difficult to insert into the space 5, but presents a problem that, in the assembled state, the sealing lip 4*e* is allowed to float during highspeed cruising, due to a negative pressure created at the external surface of the window molding, resulting in generating abnormal sound (whistling sound).

The window molding 4 shown in FIG. 5B has omitted the sealing lip 4*e*, and the linking lip 4*f* is exposed externally so that, by pressing the linking lip 4*f* towards the x-direction to insert into the space 5, it is attached to the window plate 3 and is fixed in place by the adhesive agent 8.

However, such a window molding 4 presents a problem that, due to size variations in the body panel 2 and window plate 3 and the like, when the space 5 is wide, a gap is created between the linking lip 4*f* and the space-forming surface 2*b*, or when the space 5 is narrow, the linking lip 4*f* protrudes outwardly to spoil the appearance. Also, because a bent section 9 is formed on the linking lip 4*f*, when a negative pressure is generated at the external surface during highspeed cruising, the upper section of the linking lip 4*f* can easily be floated, and after the floating, it is difficult to be reverted.

SUMMARY OF THE INVENTION

The subject of the present invention is to provide a window molding that can be installed easily to result in an installation that remains stable and has a superior external appearance, that does not cause lifting and noise generation even during highspeed cruising, and in which the sealing lip is made thin to facilitate the surfaces to be flush.

The problem has been solved according to a window molding of the present invention as follows.

(1) A window molding comprises:
  a molding body attached along a space between a window plate and a body panel;
  a protruding rib protruding from the molding body towards an external surface of the window plate;
  a leg section extending from the molding body towards the space;
  a sealing lip extending from the molding body towards an external surface of a body panel;
  a linking lip extending from the leg section towards the space-forming surface of the body panel and linking with a tip of the sealing lip or in a vicinity of the sealing lip to form a hollow section.

(2) A window molding according to the features presented in (1), wherein the leg section has an engaging section to engage with the window plate.

(3) A window molding according to one of features (1) or (2), wherein the linking lip is linked at an acute angle of incline towards the tip direction of the sealing lip.

(4) A window molding according to one of features (1) to (3), wherein the linking lip is formed with a convex surface section on the leg section side, and a concave surface section on the sealing lip side.

(5) A window molding according to one of features (1) to (4), wherein the molding body has a water receiving section in the side section.

The window molding according to the present invention is suitable for installing on the windshield plate, but it can also be applied to the rear window and other vehicular windows. Specially it is suitable for use in the upper section of the window plate which encounters severe air stream during cruising so that it may be installed only in the upper section of the window plate. It may also be installed so that the molding is formed integrally with an upper segment extending along the upper section of the window plate, a side segment pair extending along the side section of the window plate, and a corner segment pair continuously connecting the upper segments with the side segments. In the latter case, a water receiving section (weir) may be formed in the side segments of the window molding.

The molding body is constructed with an elongate member so that it can be attached along the space between the window plate and the body panel. Extending from the molding body, the protruding rib extends towards the external surface of the window plate, the leg section extends towards the space, the sealing lip extends towards the external surface of the body panel, and the linking lip links the leg section and the tip section of the sealing lip or its vicinity, resulting in the window molding that can be made as a unit with the molding body. These components may be integrated by using a process such as extrusion molding of synthetic resin (including rubber), and in this case, it is permissible to make a composite using a synthetic resin and a profiled metal strip as a core member, and may be formed as a composite of several materials such as rigid synthetic resin and plasticized (soft) synthetic resin formed into a single unit.

It is preferable that the protruding rib in the upper section be made so that the tip is close to the external surface of the peripheral section of the window plate, because flush surfacing can be facilitated, but in the side segments, rain water from the window plate can be stopped by forming a water receiving section.

It is preferable that the leg section be provided with an engaging section to engage with the window plate because firm fixation to the window plate can be achieved, and the window molding can be fixed in the correct orientation, but if other means are used for fixation, the engaging section can be omitted.

It is preferable that the sealing lip be extended to reach to external surface of the body panel, because it hides the space and produce superior appearance. It is preferable that the sealing lip be made gradually thinner towards the tip end, from the viewpoints of strength, external appearance and flush surfacing.

It is preferable that the linking lip be protruding from the leg section towards the space-forming surface of the body panel to extend along the space-forming surface from the abutting section, thereby linking with the tip section of the sealing lip or in its vicinity to form a hollow section, because the pressing force towards the space-forming surface can be increased and the tension force can be effected towards the tip section of the sealing lip. It is preferable that the sealing lip be linked at an acute inclination angle towards the tip direction of the sealing lip, because insertion into the space is facilitated and a reaction force can be effected against the lifting force on the sealing lip.

In this case, the linking lip should form a convex surface section of an arc shaped horizontal cross section on the leg side and a concave surface section of an arc shaped horizontal cross section on the sealing lip side, so that the overall shape is an S-shape in its cross section, because insertion into the space is facilitated, and the retaining force is increased by increasing the pressing force on the space-forming surface, and a tension force can be effected in the direction to prevent floating of the sealing lip. It is preferable to link the sealing lip at a location slightly in front of the tip section of the sealing lip in such a way that the tip of the sealing lip extends beyond the link section, because the protrusion section abuts the body panel to facilitate flush surfacing and provide a superior external appearance.

The above window molding may have the same cross sectional shape over the entire length, including the upper segment to the side segment, but the shape may be varied near the corner segment and a water receiving section may be formed in the side segment. The water receiving section may be formed by having a weir in the molding body, or it may be formed so that the height dimensions of the molding body, leg section and linking lip are changed. In either case, extrusion molding may be used, but injection molding and other forming processes may also be used.

The window molding is installed in a vehicle by a method of fixation in which the peripheral section of the window plate is coated with an adhesive agent to attach to the window molding, and an assembly of the window plate bonded to the window molding is coupled into the space-forming surface so as to fixate to the body panel using an adhesive agent; or it may be made after coupling the window plate similar to the above into the body panel, the leg section and the linking lip of the window molding are inserted to install on the window plate and are fixated in place by an adhesive agent.

In either case, by pressing the sealing lip from above at the same time as inserting the leg section, the force is transmitted towards the planar direction of the linking lip so that the linking lip can be installed easily by being pressed in along the space-forming surface to maintain the normal attachment orientation. The adhesive agent is hardened in-situ to attach the window molding to the window plate.

In the attached state, the linking lip plays a role of anchoring by effecting the pressing force on the space-forming surface, as well as the fact that a tension force is effected in the vicinity of the tip section of the sealing lip so that, during highspeed cruising (for example, 100~250 km/hr), sealing lip is prevented from lifting (floating so as to be separated from the body panel) even if a negative pressure is generated by the air streaming on the external surfaces. Specially during highspeed cruising, because pressurized air through the vehicle interior is introduced in the hollow section, the linking lip is pressed against the space-forming surface to prevent lifting of the sealing lip. For this reason, the sealing lip can be made thin to achieve flush surfacing and produce a superior external appearance.

When the cross sectional shape of the window molding is kept the same over the entire length from the upper section to the side section of the window plate, the above effects are obtained overall, but when the molding has the rain water receiving sections along the side segments, rain water on the window plate can be prevented from flowing onto the side windows across the side segments by guiding the rain water along the rain water receiving section so that the driver's sight through the side windows may be favorably maintained.

According to the present invention, because the leg section and the vicinity of the tip of the sealing lip are linked by the linking lip, it is possible to obtain a window molding that facilitates its installation and, once it is installed, can maintain the installed state in a stable condition and presents a superior external appearance, and even during highspeed cruising, generates no floating or abnormal noise, and allows thinning of the sealing lip to enable flush surfacing.

DESCRIPTION OF THE PREFERRED EMBODIMENTS

Preferred embodiments will be explained in the following.

Figure 1:
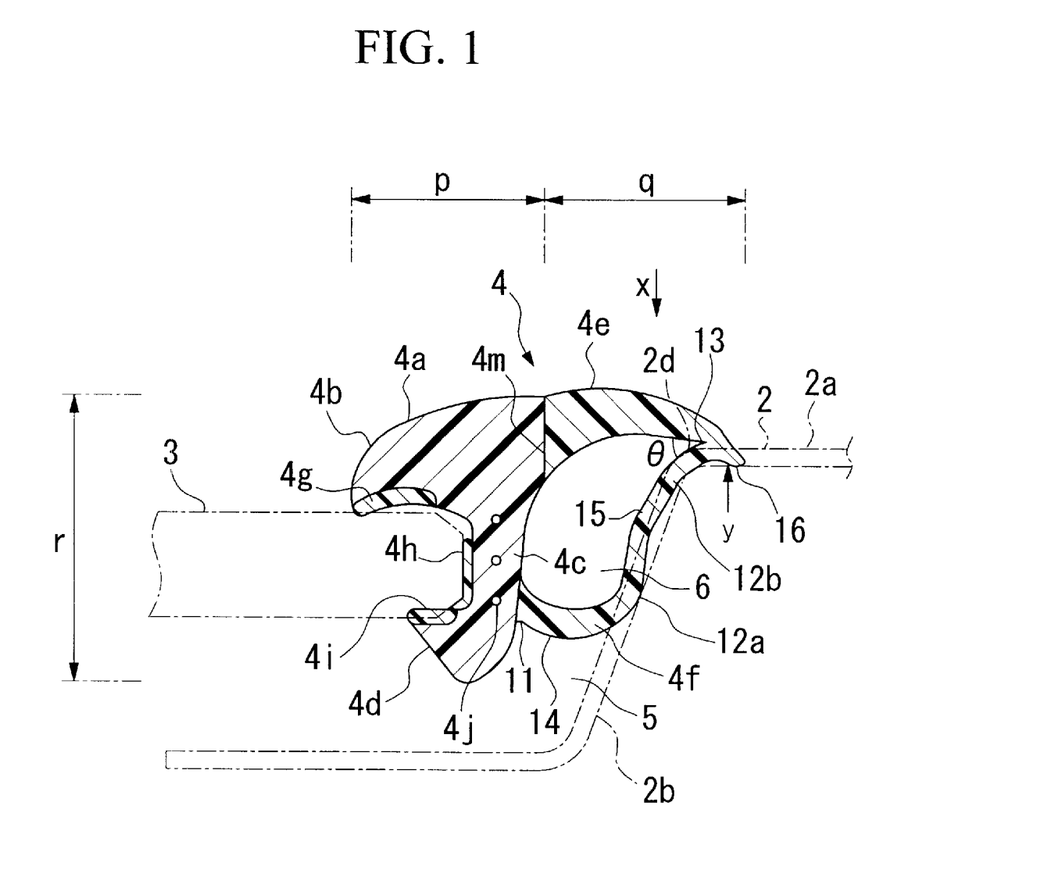
FIG. 1 is a cross sectional view of a window molding in the present embodiment.
Figure 2A:
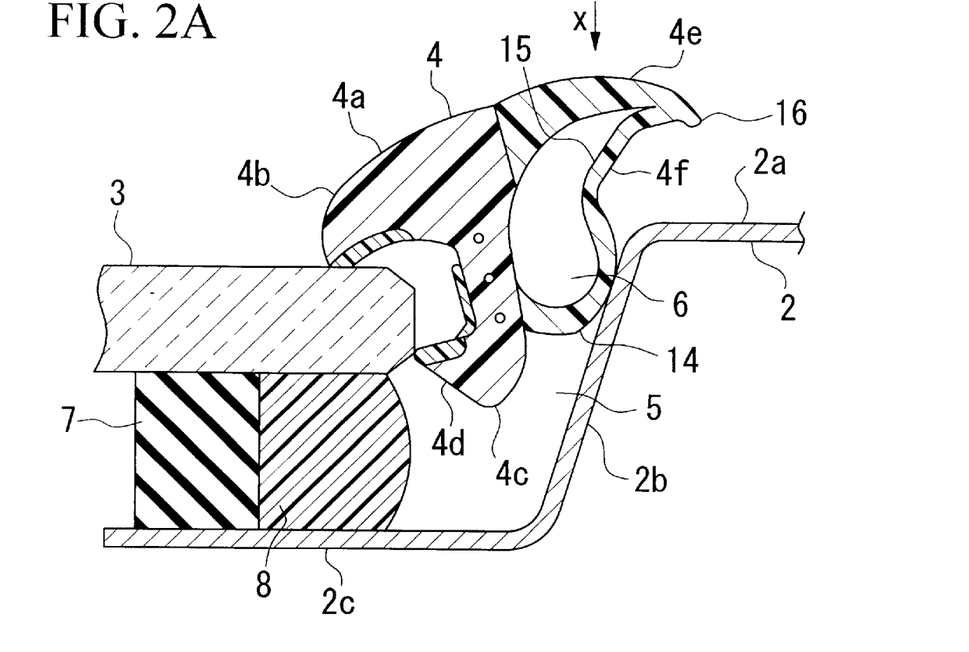
FIGS. 2A and 2B are cross sectional views of the window molding in the attached state.
Figure 2B:
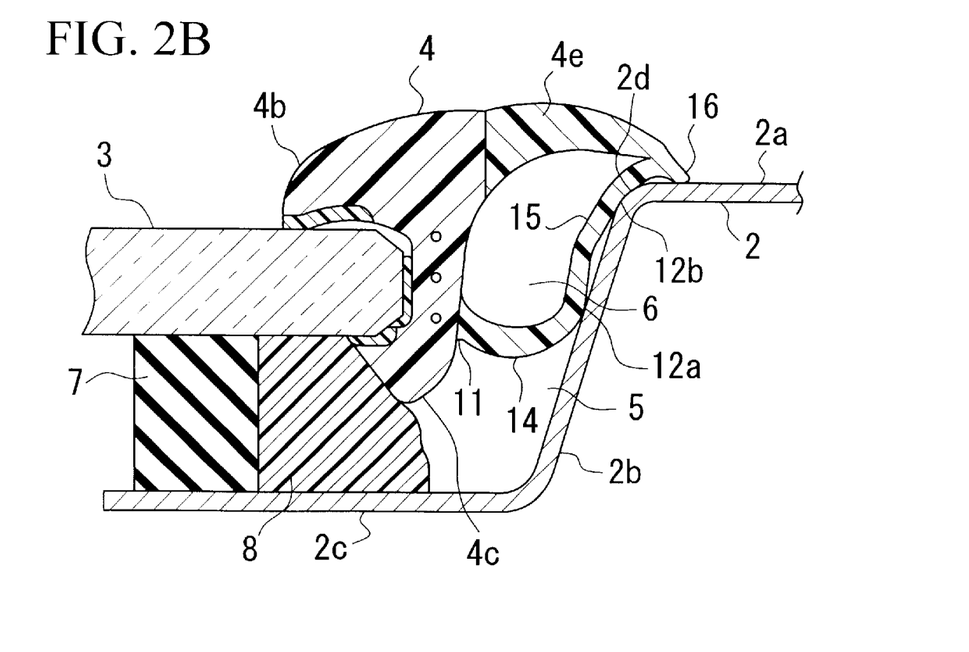

FIG. 1 shows a cross sectional view through a plane u—u of a window molding shown in FIG. 4, and FIGS. 2A, 2B show the attached states of the window molding.

The window molding 4 is comprised by: a molding body 4a attached along a space 5 between the window plate 3 and the body panel 2; a protruding rib 4b protruding from the molding body towards the external surface of the window plate; a leg section 4c extending from the molding body 4a towards a space 5; an engaging section 4d formed on the window plate 3 side of the leg section 4c; a sealing lip 4e extending from the molding body 4a towards the external surface 2a of the body panel 2; a linking lip 4f extending from the leg section 4c towards the space-forming surface 2b of the body panel 2 and coupling to a region near a tip section of the sealing lip 4e to form a hollow section 6.

The protruding rib 4b extends so as to be close to the window plate 3, and is formed in such a way to clamp the circumferential section of the window plate 3 from the peripheral section between the engaging section 4d. The protruding rib 4b, leg section 4c and the engaging section 4d have respective integrated cushion elements 4g, 4h, and 4i in the abutting section (contacting section) with the window plate 3. In the longitudinal direction of the leg section 4c, a core member 4j, comprised of a stretch-resistant fibrous material such as glass fibers, is imbedded. The sealing lip 4e extends from the molding body 4a side so as to cover a portion of the external surface 2a of the body panel 2, and the tip section is made thinner.

The linking lip 4f protrudes from the base section 11 of the space-forming surface 2b side of the leg section 4c towards the space-forming surface 2b, and extends from the first abutting section 12a approximately along the space-forming surface 2b, and links with the linking section 13 on the back surface side of the tip region of the sealing lip 4e at an acute inclined angle θ with respect to the tip direction of the sealing lip 4e. In this case, between the base section 11 of the linking lip 4f and the abutting section 12a, a convex surface section 14 having an arc-shaped horizontal cross section is formed, and between the abutting section 12a and the linking section 13, a concave surface section 15 having an arc-shaped horizontal cross section is formed, to produce an overall horizontal cross sectional shape of an S-shape. When the concave surface section 15 is formed, the concave surface section 15 abuts the ridge section 2d of the body panel 2 at a second abutting section 12b.

Because the linking section 13 is located inside the tip of the sealing lip 4e, the sealing lip 4e is shaped such that the edge section 16 protrudes from the linking section 13 towards the tip side.

The molding body 4a, protruding rib 4b, leg section 4c and engaging section 4d of the window molding 4 are comprised by a semi-hard material of Shore hardness A of 90~100 [HsA] such as polyvinyl chloride (PVC), and the sealing lip 4e, linking lip 4f, cushion elements 4g, 4h, 4i are made of a soft material such as polyvinyl chloride (PVC) and rubber of Shore hardness A of 60~75 [HsA], and are formed as an integral body by extrusion molding with the core member 4j imbedded therein. Such materials are not limited to those mentioned above, and, for example, the core member 4j shown in FIG. 5A comprised by a profiled metal strip may be integrated in a composite form.

The window molding 4 is suitable for use in the upper segment U shown in FIG. 4 as a basic rule, and the above construction can be applied to the upper segment U only, and the side segment S may be made into other shapes and may be attached in comer joint, or may be continuously integrated with the upper segment U. The window molding 4 having the same cross sectional shape may be used for all the upper segment U, comer segment C and side segment S, and in such a case, the cross sectional shapes through the u—u, c—c and s—s planes in FIG. 4 are as shown in FIG. 1.

FIG. 2A shows a state of attachment, and after discharging the adhesive agent 8 on the circumferential section of the dam rubber 7 of the window plate 3 and attaching to the flange section 2c of the body panel 2, the window molding 4 is inserted in the space 5 from the leg section 4c side. In this case, when the molding body 4a is pressed in the x-direction arrow, the sealing lip 4e and linking lip 4f can deform elastically due to friction at the linking lip 4f, so that the leg section 4c may sometimes stop without being completely inserted, but even in such a case, if the sealing lip 4e is pressed in the x-direction or towards the space-forming surface 2b, because the pressing force is applied approximately in the planar direction of the abutting section 12a, the leg section 4c is pressed in and the engaging section 4d is engaged with the window plate 3, and a state shown in FIG. 2B is produced. The window molding 4 is fixed in place when the adhesive agent 8 is hardened in-situ.

Even when an installation is made by attaching the window molding 4 beforehand to the window plate 3 and pressing the assembly to the body panel in the x-arrow direction, the sealing lip 4e and the linking lip 4f are similarly deformed elastically so that the leg section 4c may sometimes stop without being completely inserted, but even in such a case, when the sealing lip 4e is pressed in the x-direction or towards the space-forming surface 2b, the pressing force is applied approximately in the planar direction of the abutting section 12a, so that the linking lip 4f is inserted to a certain location.

Accordingly, as shown in FIG. 2B, the first abutting section 12b a abuts the space-forming surface 2b, and the concave surface section 15 of the upper section extends approximately along the space-forming surface 2b towards the vehicle exterior, the second abutting section 12b contacts the ridge section 2d of the body panel 2, and the edge section 16 of the sealing lip 4e intimately contacts the external surface 2a of the body panel 2. In this case, because the convex surface section 14 has been inserted by elastically deforming, the reversion force acts as the force to push the leg section 4c towards the window plate 3 side, so that the leg section 4c is fixed in place by the adhesive agent 8 in a condition of being pushed against the window plate 3.

On the other hand, the reversion force of the convex surface section 14 causes the first and second abutting sections 12a, 12b to be pushed against the ridge section 2d and the space-forming surface 2b of the body panel 2 to provide an anchoring effect, and the tension force is transmitted through the concave surface section 15 to a region near the tip section of the sealing lip 4e. Also, because the linking lip 4f is pushed in, the second abutting section 12b is pushed against the ridge section 2d of the body panel 2 and the concave surface section 15 is elastically deformed so that, although the linking lip 4f is made easier to be inserted, in the assembled state, the reversion force of the concave surface section 15 produces a tension force to effect the tip section of the sealing lip 4e to be pulled towards the body panel 2 side.

For this reason, even when the sealing lip 4e is subjected to a force in the lifting direction during highspeed cruising by a negative pressure generated on the external surface of the vehicle, the sealing lip 4e is pulled by the linking lip 4f to prevent being lifted and separation from the external surface 2a of the body panel. Specially during highspeed cruising, air pressure is applied to the vehicle, and air flows in from the edge section of the window molding into the hollow section 6 so that the linking lip 4f is pressed intimately especially to the space-forming surface 2b of the body panel 2. This arrangement together with the tension force of the linking lip 4f prevent abnormal noise caused by floating of the sealing lip 4e. For example, as shown in FIG. 4, by attaching the window molding 4 from the upper segment U to the side segment S through the corner segment C, the end section is inserted normally from the bottom end of the side segment S into the fender, and the opening end is left as it is as shown in FIG. 1, so that air streaming through the interior of the fender during cruising of the vehicle enters the hollow section 6 and is compressed to prevent the sealing lip 4e to float. Therefore, it is possible to reduce the thickness of the sealing lip 4e, thereby enabling flush surfacing and improving the external appearance also.

Figure 3A:
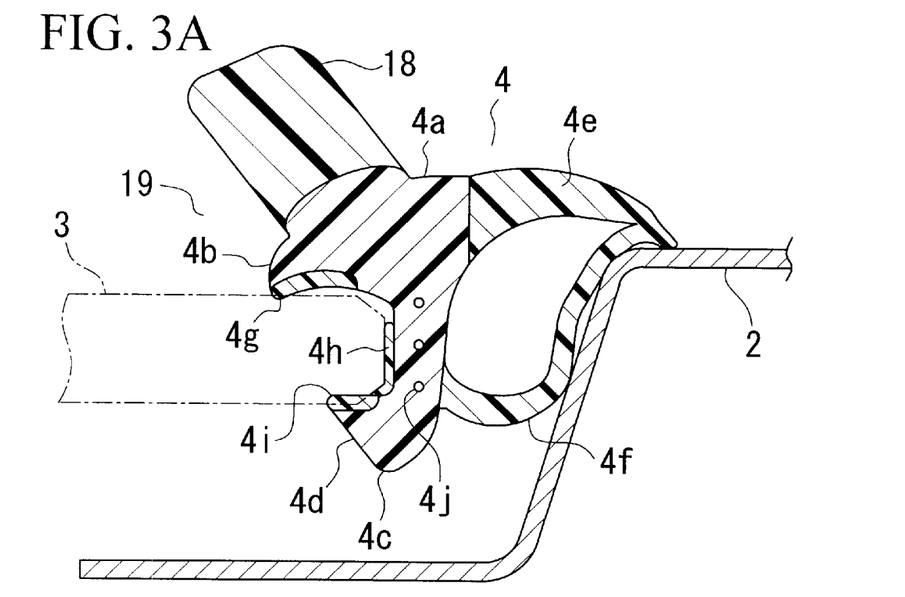
FIGS. 3A and 3B are cross sectional views of the window molding in another embodiment in the attached state.

FIG. 3A shows a cross sectional view of the window molding, through a plane s—s in FIG. 4, having a weir (water receiving section) in the side segment S. The upper segment U of the window molding 4 has a horizontal cross sectional shape shown in FIG. 1, that changes gradually near the corner segment C, and, in the side segment S, to the shape changes to that shown in FIG. 3A. The basic shape of the window molding 4 in the side segment S is the same as that shown in FIG. 1, but the weir 18 is added to the protruding rib 4b by extrusion molding.

The window molding 4 described above is attached over the entire length in the same manner as those shown in FIGS. 1 and 2, and in the upper segment U, the same operational manner and effects are produced. In the side segment S, in addition to the above, rain water on the window plate 3 flows along the drain channel 19 by the weir 18, thereby preventing degradation of visibility due to lateral flow towards the side window.

Figure 3B:
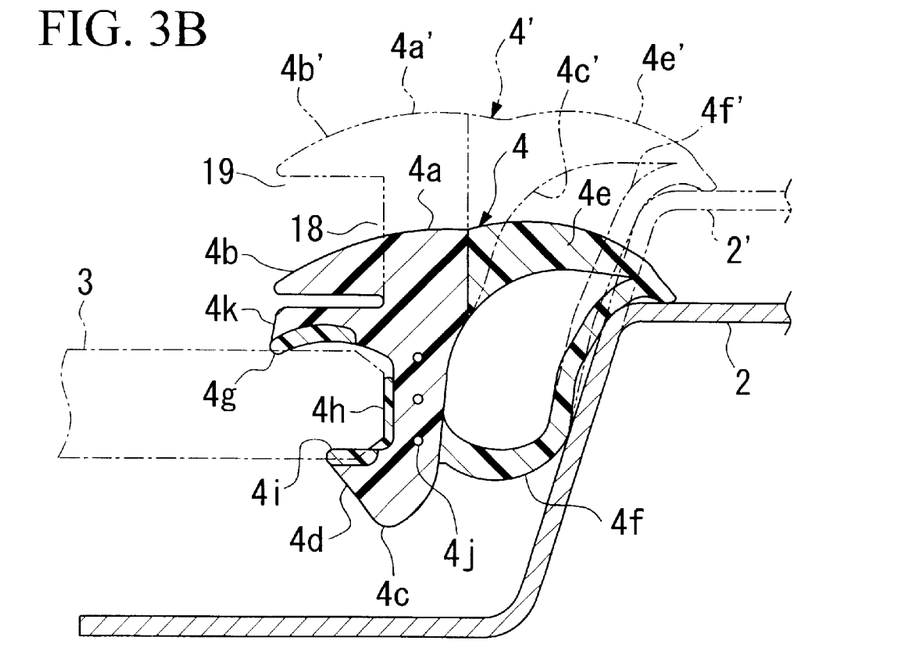

FIG. 3B shows a cross sectional view of another embodiment having a weir (water receiving section) formed in the side segment, and the solid line shows a cross section through a plane u—u and dotted line shows a cross section through a plane s—s in FIG. 4. The window molding 4 is constructed so that, the cushion element 4g is formed in the engaging section 4k extending on the external surface of the window plate 3, and clamping the window plate 3 together with the engaging section 4d. The body panel 2 and the molding body 4a, protruding rib 4b, leg section 4c, sealing lip 4e and linking lip 4f of the window molding 4 are located in the lower location of the upper segment U as shown by the solid line, but are changed near the corner segment C, and in the side segment S, are extended higher as shown by respective dotted lines (4', 4a' 4b', 4c', 4e', 4f), and the protruding rib 4b' forms a weir 18 and the water drain channel 19 between the engaging section 4k.

The window molding 4 above is used for a vehicle having different height of the body panel 2 in the upper section and in the side section, and is attached in the same manner as indicated in FIG. 3A. In the assembled state, the protruding rib 4b in the upper segment is close to the engaging section 4k, and has an effect similar to that shown in FIG. 1, but in the side segment, the weir 18 where the protruding rib 4b' is formed apart from the engaging section 4k receives rain water, and guides it along the water drain channel 19 to prevent the lateral flow towards the side window.

EXAMPLE 1

In FIG. 1, the material used for the molding body 4a, protruding rib 4b, leg 4c and engaging section 4d was a rigid polyvinyl chloride of Shore hardness A 95 [HsA], and the material used for the sealing lip 4e, linking lip 4f and cushion elements 4g, 4h, 4i was a thermoplastic elastomer, and the window molding 4 was manufactured by extrusion molding to form a horizontal width p=8 mm from the joint surface 4m to the tip of protruding rib 4b, the horizontal width q=9 mm from the joint surface 4m to the tip of the sealing lip 4e, and the height r=13 mm. This window molding was cut into 10 mm length, which was loaded in the y-arrow direction to measure the load required to displace the tip of the edge section 16 over a certain distance.

Comparison Example 1

The linking lip 4f of the window molding of Example 1 was cut off at the second abutting section 12b in the longitudinal direction, and tested similarly.

The results are as shown in Table 1, and it can be seen that the samples in the Example are able to endure higher loads than the samples in Comparison, and exhibits a higher lifting resistance effect.

TABLE 1

| Displacement (mm) | Example 1 load (g) | Comparison 1 load (g) |
| --- | --- | --- |
| 1 | 40 | 10 |
| 2 | 120 | 40 |

What is claimed is:
1. A window molding comprising:
   a molding body attached along a space between a window plate and a body panel;
   a protruding rib protruding from the molding body towards an external surface of the window plate;
   a leg section extending from the molding body towards the space;
   a sealing lip extending from the molding body to an external surface of a body panel;
   a linking lip extending from the leg section towards a space-forming surface of the body panel and linking with a tip of the sealing lip to form a hollow section, wherein
   the linking lip is formed with a convex surface section extending from the leg section, and a concave surface section extending from the sealing lip, and
   the convex surface section and the concave surface section are continuously connected to each other.
2. A window molding according to claim 1, wherein the leg section has an engaging section to engage with the window plate.
3. A window molding according to claim 1 or 2, wherein the linking lip is linked at an acute angle of incline towards a direction of the tip of the sealing lip.
4. A window molding according to claim 1 or 2, wherein the linking lip is formed into an S-shape in cross section.
5. A window molding according to claim 1 or 2, wherein the molding body has a weir, protruding with respect to the window plate, from the molding body.
6. A window molding according to claim 3, wherein the linking lip is formed into an S-shape in cross section.
7. A window molding according to claim 3, wherein the molding body has a weir, protruding with respect to the window plate, from the molding body.
8. A window molding comprising:
   a molding body attached along a space between a window plate and a body panel;
   a protruding rib protruding from the molding body towards an external surface of the window plate;
   a leg section extending from the molding body towards the space;
   a sealing lip extending from the molding body to an external surface of a body panel;
   a linking lip extending from the leg section towards a space-forming surface of the body panel and linking substantially with a tip of the sealing lip to form a hollow section, wherein
   the linking lip comprises:
      an abutting section which abuts the space-forming surface of the body panel;
      a convex surface section starting from the abutting section to the molding body; and a concave surface section starting from the abutting section to a linking section of the linking lip and the sealing lip.

9. A window molding according to claim 8, wherein the molding body has a weir, protruding with respect to the window plate, from the molding body.

10. A window molding according to claim 8, wherein the leg section has an engaging section to engage with the window plate.

11. A window molding according to claim 10, wherein the linking lip is linked at an acute angle of incline towards a direction of the tip of the sealing lip.

12. A window molding according to claim 11, wherein the molding body has a weir, protruding with respect to the window plate, from the molding body.

13. A window molding according to claim 10, wherein the linking lip is formed into an S-shape in cross section.

14. A window molding according to claim 10, wherein the molding body has a weir, protruding with respect to the window plate, from the molding body.

15. A window molding according to claim 8, wherein the linking lip is formed into an S-shape in cross section.

16. A window molding according to claim 8, wherein the linking lip is linked at an acute angle of incline towards a direction of the tip of the sealing lip.

17. A window molding according to claim 16, wherein the molding body has a weir, protruding with respect to the window plate, from the molding body.

18. A window molding according to claim 8, wherein the linking lip is formed into an S-shape in cross section.

* * * * *